(12) United States Patent
Tsai

(10) Patent No.: US 7,494,334 B2
(45) Date of Patent: Feb. 24, 2009

(54) MOLD ASSEMBLY

(75) Inventor: Ming-Chiang Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 33 days.

(21) Appl. No.: 11/555,657

(22) Filed: Nov. 1, 2006

(65) Prior Publication Data

US 2007/0104827 A1    May 10, 2007

(51) Int. Cl.
*B29C 45/04* (2006.01)

(52) U.S. Cl. ............... 425/190; 425/193; 425/808; 425/451.4; 425/DIG. 5

(58) Field of Classification Search ............ 425/190, 425/192 R, 193, 577, 150, 451.5, 808, 195, 425/451.4, DIG. 5
See application file for complete search history.

(56) References Cited

U.S. PATENT DOCUMENTS

| 2,532,501 | A | * | 12/1950 | Johnson ............... 264/40.5 |
|---|---|---|---|---|
| 3,226,771 | A | * | 1/1966 | Szugda ............... 249/67 |
| 3,773,446 | A | * | 11/1973 | Borrini ............... 425/78 |
| 3,873,257 | A | * | 3/1975 | Vanotti ............... 425/112 |
| 4,184,835 | A | * | 1/1980 | Talbot ............... 425/577 |
| 4,364,878 | A | * | 12/1982 | Laliberte et al. ...... 264/2.2 |
| 4,470,786 | A | * | 9/1984 | Sano et al. .......... 425/125 |
| 4,576,775 | A | * | 3/1986 | Kaeufer et al. ....... 264/323 |
| 4,664,854 | A | * | 5/1987 | Bakalar ............. 264/2.2 |
| 4,778,632 | A | * | 10/1988 | Bakalar ............. 264/2.2 |
| 4,793,453 | A | * | 12/1988 | Nishimura ......... 192/84.81 |
| 4,820,149 | A | * | 4/1989 | Hatakeyama et al. ... 425/555 |
| 4,867,672 | A | * | 9/1989 | Sorensen ........... 425/577 |
| 4,933,119 | A | * | 6/1990 | Weymouth, Jr. ...... 264/1.1 |
| 4,980,115 | A | * | 12/1990 | Hatakeyama et al. .. 264/328.7 |
| 5,093,049 | A | * | 3/1992 | Uehara et al. ........ 264/2.2 |
| 5,512,221 | A | * | 4/1996 | Maus et al. .......... 264/2.5 |
| 5,529,483 | A | * | 6/1996 | Abe et al. ............ 425/589 |
| 5,733,483 | A | * | 3/1998 | Soane et al. ......... 264/1.7 |
| 5,733,585 | A | * | 3/1998 | Vandewinckel et al. . 425/192 R |
| 5,773,585 | A | * | 6/1998 | Hongo et al. ........ 435/189 |
| 5,792,392 | A | * | 8/1998 | Maus et al. .......... 264/2.5 |
| 5,972,252 | A | * | 10/1999 | Saito et al. .......... 264/2.2 |
| 5,989,471 | A | * | 11/1999 | Lian et al. .......... 264/271.1 |
| 6,042,754 | A | * | 3/2000 | Yang et al. .......... 264/1.1 |
| 6,206,682 | B1 | * | 3/2001 | Vovan ............... 425/556 |
| 6,210,610 | B1 | * | 4/2001 | Saito et al. .......... 264/2.2 |
| 6,241,931 | B1 | * | 6/2001 | Ciccone et al. ...... 264/318 |
| 6,494,706 | B2 | * | 12/2002 | Tumlin et al. ........ 425/577 |
| RE38,617 | E | * | 10/2004 | Saito et al. .......... 264/2.2 |
| 6,814,900 | B2 | * | 11/2004 | Tumlin et al. ........ 264/1.37 |
| 7,090,800 | B2 | * | 8/2006 | Clarke .............. 264/328.7 |
| 7,125,505 | B1 | * | 10/2006 | Dona et al. .......... 264/2.5 |
| 2004/0217495 | A1 | * | 11/2004 | Takeda ............... 264/1.1 |
| 2005/0212154 | A1 | * | 9/2005 | Inoue et al. ......... 264/1.32 |

\* cited by examiner

*Primary Examiner*—Steven P Griffin
*Assistant Examiner*—Seyed Masoud Malekzadeh
(74) *Attorney, Agent, or Firm*—Steven M. Reiss

(57) ABSTRACT

The mold assembly (100) is provided including a mold plate (20), a mold core (30), an elastic member (40) and an adjusting member (50). The mold plate has a receiving cavity (25) and a receiving aperture (27) defined therein. The mold core is received in the receiving cavity. The elastic member, configured to restore the mold core to its previous position, is disposed between the mold plate and the mold core. The adjusting member is received in the receiving aperture, engaging with the mold core to drive the mold core to move relative to the mold plate.

12 Claims, 3 Drawing Sheets

MOLD ASSEMBLY

BACKGROUND OF THE INVENTION

1. Field of the Invention

The present invention relates generally to mold assemblies and, more particularly, to a mold assembly with an adjustable mold core.

2. Description of Related Art

With the development of technology, portable electronic devices for imaging, such as digital cameras and mobile phones with camera lens modules have all entered widespread use.

A typical camera lens module for a portable electronic device includes a variety of lenses, which can generally be classified either as aspherical plastic lenses or as aspherical glass lenses. Usually, a lens mold assembly is used to manufacture the two kinds of lens. The lens mold assembly includes an upper mold and a lower mold, which cooperatively form a mold core therebetween. The mold core is used to mold the lens. The mold core includes an upper mold core and a lower mold core. The upper mold includes an upper mold plate, and the upper mold core is fixed to the upper mold plate. The lower mold includes a lower mold plate, and the lower mold core is fixed to the lower mold plate. A shape of the lens, as well as interior or exterior surface of the lens, depends on a shape and an interior surface of the mold core. In assembly of the mold assembly, the lower mold core cannot fix precisely to the lower mold plate, and the upper mold core cannot fix precisely to the upper mold plate. Thus the high lens surface precision cannot be achieved.

Typically, the mold assembly needs to be modified to achieve as high a precision of assembly as possible. The distance between the upper mold core and the lower mold core needs to be adjusted. However, this costs too much time and too much money.

What is needed, therefore, is a mold assembly that can overcome the above-mentioned shortcomings.

SUMMARY OF THE INVENTION

In one embodiment thereof, a mold assembly is provided including a mold plate, a mold core, an elastic member and an adjusting member. The mold plate has a receiving cavity and a receiving aperture defined therein. The mold core is received in the receiving cavity. The elastic member, configured to restore the mold core to its previous position after having been displaced, is disposed between the mold plate and the mold core. The adjusting member is received in the receiving aperture, engaging with the mold core to drive the mold core to move relative to the mold plate.

Other advantages and novel features will become more apparent from the following detailed description when taken in conjunction with the accompanying drawings.

BRIEF DESCRIPTION OF THE DRAWINGS

Many aspects of the mold assembly can be better understood with reference to the following drawings. These drawings are not necessarily drawn to scale, the emphasis instead being placed upon clearly illustrating the principles of the present mold assembly. Moreover, in the drawings like reference numerals designate corresponding parts throughout the several views, in which.

DETAILED DESCRIPTION OF PREFERRED EMBODIMENTS

Figure 1:
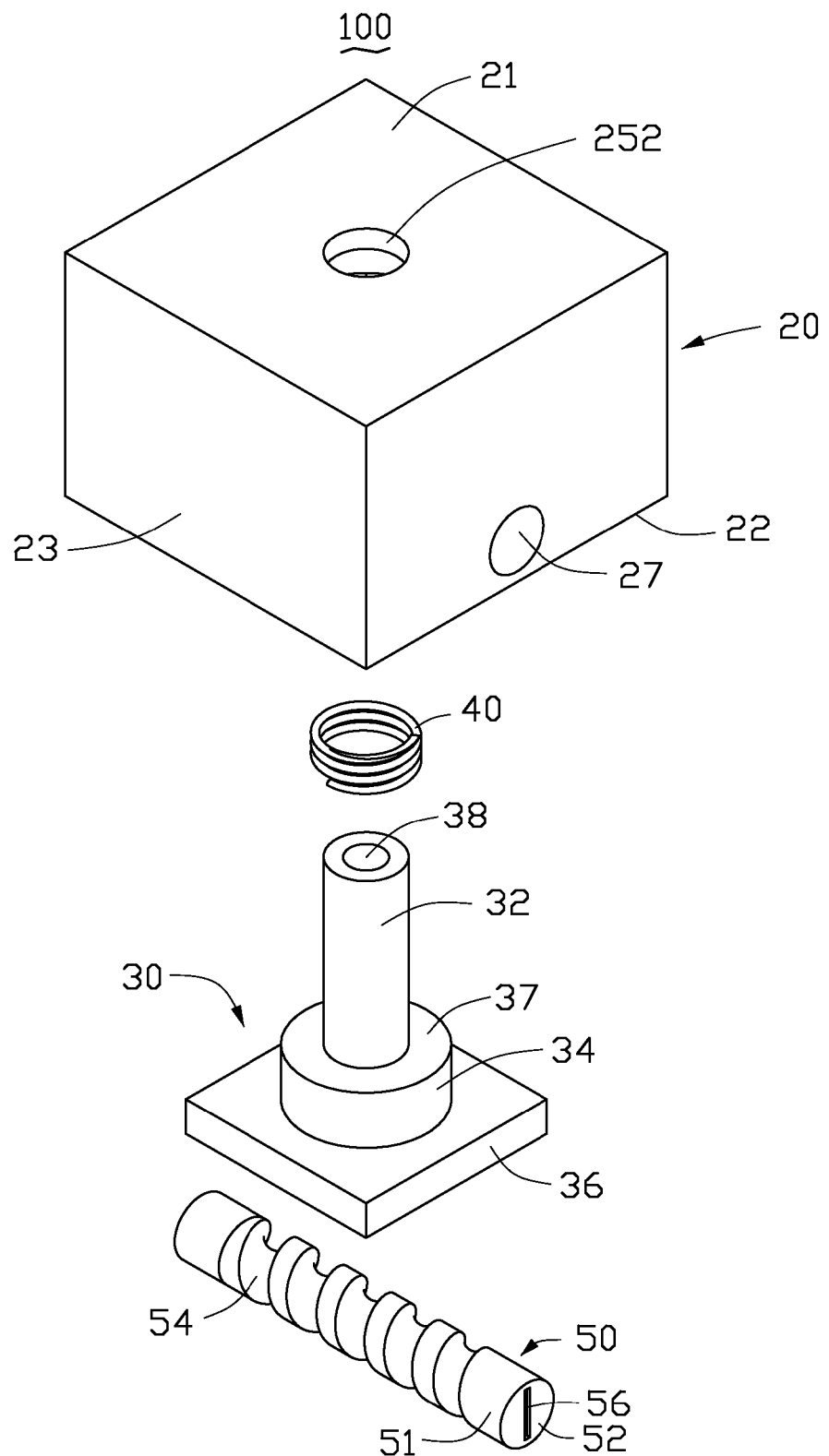
FIG. 1 is an exploded isometric view of a mold assembly in accordance with a preferred embodiment.

Referring to the drawings in detail, FIG. 1 shows a mold assembly 100 including a mold plate 20, a mold core 30, an elastic member 40 and an adjusting member 50, in which the mold core 30, the elastic member 40 and the adjusting member 50 are assembled together.

Figure 2:
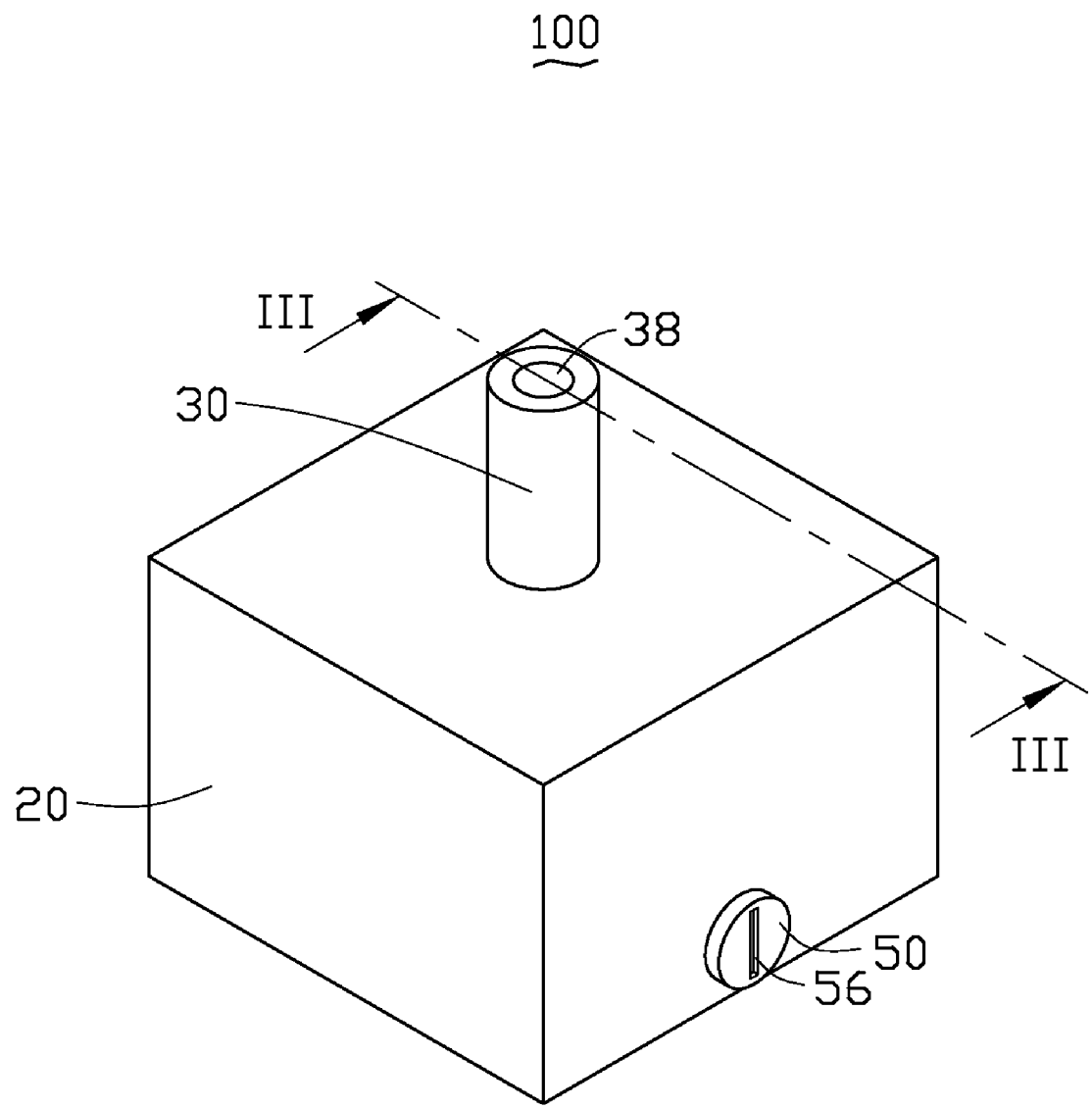
FIG. 2 is an assembled view of the mold assembly shown in FIG. 1.
Figure 3:
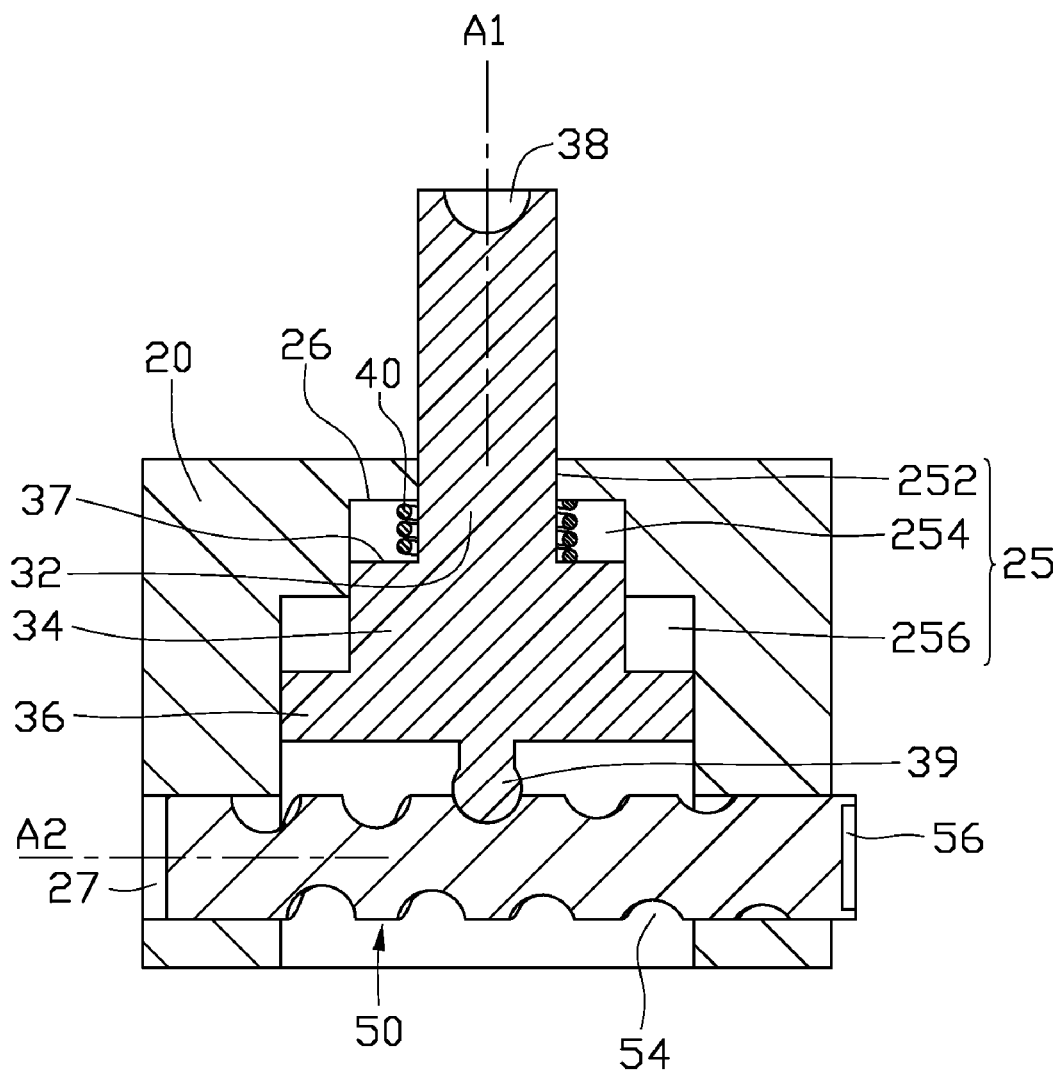
FIG. 3 is a sectional view of the mold assembly taken along the III-III line in FIG. 2.

Referring also to FIGS. 2 and 3, the mold plate 20 is generally cube-like, and includes an upper wall 21, a lower wall 22 and four sidewalls 23. The upper wall 21 is opposite to the lower wall 22, and each sidewall 23 abuts on the upper wall 21 and the lower wall 22 respectively. A receiving cavity 25 is defined through the upper wall 21 and the lower wall 22 centered about a line A1, and is located in the middle of the mold plate 20. The receiving cavity 25 is cooperatively formed by a plurality of interior walls 26 of the mold plate 20. The receiving cavity 25 can be separated into an opening 252, a first receiving cavity 254 and a second receiving cavity 256. The opening 252, the first receiving cavity 254 and the second receiving cavity 256 may have various kinds of shape. The opening 252 is preferably of circular shape. The first receiving cavity 254 is preferably of circular shape. The second receiving cavity 256 is preferably of rectangular shape. The second receiving cavity 256 is bigger than the first receiving cavity 254, and the second receiving cavity 256 and the first receiving cavity 254 are coaxially defined. A receiving aperture 27 is defined through the two opposite sidewalls 23 centered by a line A2. The A2 line is roughly perpendicular to the A1 line, and the receiving aperture 27 communicates with the second receiving cavity 256. The receiving aperture 27 may have various kinds of shape, and is preferably of a circular shape.

The mold core 30 includes a core portion 32, a first engaging portion 34 and a second engaging portion 36. The core portion 32 has roughly the same size and shape as the opening 252 of the mold plate 20. One end of the core portion 32 abuts the first engaging portion 34, and is located at the middle of the first engaging portion 34, thus forming a step portion 37 therebetween. The opposite end of the core portion 32 has a mold cavity 38 defined therein. The first engaging portion 34 has roughly the same size and shape as the first receiving cavity 254 of the mold plate 20. The second engaging portion 36 has roughly the same size and shape as the second receiving cavity 256, and abuts the first engaging portion 34 in opposition to the core portion 32. The second engaging portion 36 has an adjusting block 39 extending downwards from a bottom thereof. The adjusting block 39 is located opposite to the first engaging portion 34 and the core portion 32.

The elastic member 40 functions to restore the mold core 30. The elastic member 40 is preferably a coil spring. An external diameter of the elastic member 40 is less than a diameter of the first receiving cavity 254, and an internal diameter of the elastic member 40 is more than a diameter of the opening 252.

The adjusting member 50 has roughly the same size and shape as the receiving aperture 27 of the mold plate 20. In the preferred embodiment, the adjusting member 50 is generally cylindrical-like, and includes a peripheral wall 51 and an end wall 52 abutting on the peripheral wall 51. The peripheral wall 51 has a spiral groove 54 extending from one end of the adjusting member 50 to the other end of the adjusting member 50. The spiral groove 54 has a depth gradually increasing from one end of the adjusting member 50 to the other end of the adjusting member 50. The end wall 52 has a rectangular slot 56 defined thereof, for facilitating the operation of the adjusting member 50.

In assembly of the mold assembly 100, the elastic member 40 is disposed around the core portion 32 of the mold core 30 with one end of the elastic member 40 contacting the step portion 37 of the mold core 30. The mold core 30 with the elastic member 40 is aligned with the receiving cavity 25 of the mold plate 20, and then is inserted from the second receiving cavity 256 until the core portion 32 is exposed through the opening 252. In this case, the core portion 32, the first engaging portion 34 and the second engaging portion 36 are respectively received in the opening 252, the first receiving cavity 254 and the second receiving cavity 256 of the mold plate 20. The adjusting member 50 is aligned with the receiving aperture 27 of the mold plate 20, and is then inserted thereinto. In this case, the adjusting member 50 is received in the receiving aperture 27, and can rotate or slide relative to the receiving aperture 27. The adjusting block 39 of the mold core 30 engages with the spiral groove 54 of the adjusting member 50, which enables the elastic member 40 to be compressed within the first receiving cavity 254. The two ends of the elastic member 40 resist the step portion 37 of the mold core 30 and the interior wall 26 of the mold plate 20, respectively.

In use of the mold assembly 100, the position of the mold core 30 within the receiving cavity 25 may be slightly adjusted. The adjusting member 50 can be rotated in the receiving aperture 27 by operating the rectangular slot 56. When the adjusting member 50 is rotated to move into the receiving aperture 27, the adjusting block 39 of the mold core 30 slidably engages in the spiral groove 54 of the adjusting member 50. In the case, the mold core 30 is gradually lifted up because of the gradually increasing depth of the spiral groove 54. When the mold core 30 is lifted up, the elastic member 40 is compressed. When the adjusting member 50 is rotated to move out from the receiving aperture 27, the adjusting block 39 of the mold core 30 slidably engages in the spiral groove 54 of the adjusting member 50. In this case, the mold core 30 is gradually lowered because of the gradually decreasing depth of the spiral groove 54, while the elastic member 40 is released.

A main advantage of the mold assembly 100 is that the mold core 30 being received in the mold plate 20 can be easily adjusted to move relative to the mold plate 20 by means of adjusting the adjusting member 50. The mold core 30 can move up and down relative to the mold plate 20 along a first longitudinal direction, while the adjusting member 50 can move along a second longitudinal direction perpendicular to the first direction. There is no need to modify the mold assembly 100, thus reducing the production cost greatly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold assembly, comprising:
    a mold plate, the mold plate having a receiving cavity and a receiving aperture defined therein;
    a mold core being received in the receiving cavity, the mold core having an adjusting block arranged thereon;
    an elastic member being disposed between the mold plate and the mold core, the elastic member configured to restore the mold core to the mold core's previous position if displaced; and
    an adjusting member being received in the receiving aperture and comprising a rotatable groove, the adjusting member engaging with the mold core to drive the mold core to move relative to the mold plate during rotation of the groove, the adjusting block engaging into the groove and configured for moving the mold core during rotation of the groove.

2. The mold assembly as claimed in claim 1, wherein the groove is provided with an increasing depth from one end thereof to the other opposite end thereof.

3. The mold assembly as claimed in claim 2, wherein the groove is helically defined extending from one end of the adjusting member to the other end of the adjusting member with an increasing depth.

4. The mold assembly as claimed in claim 2, wherein the mold plate includes a plurality of interior walls, the receiving cavity being formed by the interior walls, the receiving cavity being step-shaped and including an opening, a first receiving cavity and a second receiving cavity connecting the first receiving cavity.

5. The mold assembly as claimed in claim 4, wherein the mold core includes a core portion, a first engaging portion and a second engaging portion, the core portion engaging with the opening, the first engaging portion engaging with the first receiving cavity, the second engaging portion engaging with the second receiving cavity.

6. The mold assembly as claimed in claim 5, wherein the first engaging portion and a second engaging portion cooperatively form a step portion, the elastic member resisting the step portion and the interior wall of the mold plate.

7. The mold assembly as claimed in claim 4, wherein the adjusting block extends downwardly from a bottom of the second engaging portion, and the adjusting member includes a peripheral wall, the groove being defined along the peripheral wall.

8. The mold assembly as claimed in claim 4, wherein the adjusting member also includes an end wall, the end wall abutting on the peripheral wall, the end wall having a slot defined therein.

9. The mold assembly as claimed in claim 1, wherein the mold plate includes an upper wall, a lower wall and four sidewalls, each sidewall abutting on the upper wall and the lower wall, the receiving cavity being defined through the upper wall and the lower wall, the receiving aperture being defined through the two opposite sidewalls, the receiving aperture communicating with the receiving cavity.

10. A mold assembly, comprising:
    a mold plate, the mold plate having a receiving portion and a receiving aperture defined therein, the receiving portion communicating with the receiving aperture;
    an elastic member the elastic member positioned between the mold plate and the mold core;
    a mold core being received in the receiving portion, the mold core having an adjusting block arranged thereon; and
    an adjusting member, the adjusting member being received in the receiving aperture and defining a rotatable groove, the adjusting member engaging with the mold core and the adjusting block engaging into the groove, the adjusting member being configured such that rotation of the adjusting member about a first longitudinal axis thereof gives rise to a movement of the mold core along a second longitudinal axis, perpendicular to the first longitudinal axis, and movement of the adjusting block being caused by rotation of the groove.

11. The mold assembly as claimed in claim 10, wherein the groove is provided with an increasing depth from one end thereof to the other opposite end thereof.

12. The mold assembly as claimed in claim 11, wherein the groove is helically defined extending from one end of the adjusting member to the other end of the adjusting member with an increasing depth.

* * * * *